United States Patent [19]
Gerl et al.

[11] Patent Number: 5,449,186
[45] Date of Patent: Sep. 12, 1995

[54] REAR WHEEL STEERING SYSTEM

[75] Inventors: Gerhard Gerl, Regensburg; Franz Lacher, Tegernheim; Michael Ulm, Alteglofsheim; Helmut Patze, Frammersbach; Reiner Bartholomäus, Neuendorf; Liebhart Zaiser, Karlstadt-Wiesenfeld; Rolf Neuhaus, Lohr/Main, all of Germany

[73] Assignee: Siemens AG, Munich, Germany

[21] Appl. No.: 17,057

[22] Filed: Feb. 12, 1993

[30] Foreign Application Priority Data

Feb. 12, 1992 [DE] Germany ............. 42 04 123.6

[51] Int. Cl.⁶ .................................. B62D 5/06
[52] U.S. Cl. ............................. 180/140; 180/142; 180/162
[58] Field of Search ............... 180/140, 141, 143, 142, 180/162

[56] References Cited

U.S. PATENT DOCUMENTS

| | | | |
|---|---|---|---|
| 4,973,069 | 11/1990 | Edahiro et al. | 180/140 |
| 5,012,881 | 5/1991 | Yokote et al. | 180/140 |
| 5,048,627 | 9/1991 | Eguchi et al. | |
| 5,099,938 | 3/1992 | Watanabe et al. | 180/140 |
| 5,186,273 | 2/1993 | Mori | 180/140 |
| 5,195,603 | 3/1993 | Sugiyama | 180/140 X |
| 5,217,083 | 6/1993 | Bachhuber et al. | 180/140 |

FOREIGN PATENT DOCUMENTS

| | | |
|---|---|---|
| 0350020 | 7/1989 | European Pat. Off. |
| 0419925 | 9/1990 | European Pat. Off. |
| 3811312 | 10/1989 | Germany |
| 9205781 | 3/1992 | Germany |
| 4133006 | 7/1992 | Germany |
| 4126898 | 2/1993 | Germany |

Primary Examiner—Eric D. Culbreth
Assistant Examiner—Carla Mattix
Attorney, Agent, or Firm—Cushman, Darby & Cushman

[57] ABSTRACT

An actuating system is provided that includes a differential hydraulic cylinder containing a piston and a piston rod connected to one side of the piston. A first or head chamber (53) is defined in the cylinder and is bounded by the one side of the piston, to which the piston rod is not connected. A second or rod chamber (54) is also defined in the cylinder and is bounded by the other side of the piston, to which the piston rod is connected. An actuatable assembly is provided that is adapted to be connected to either the hydraulic cylinder or the piston rod. Finally, a proportional control valve is provided which is adapted to actuate the hydraulic cylinder by controlling the amount of fluid supply to the first chamber, wherein the supply pressure is connected to the second chamber.

6 Claims, 11 Drawing Sheets

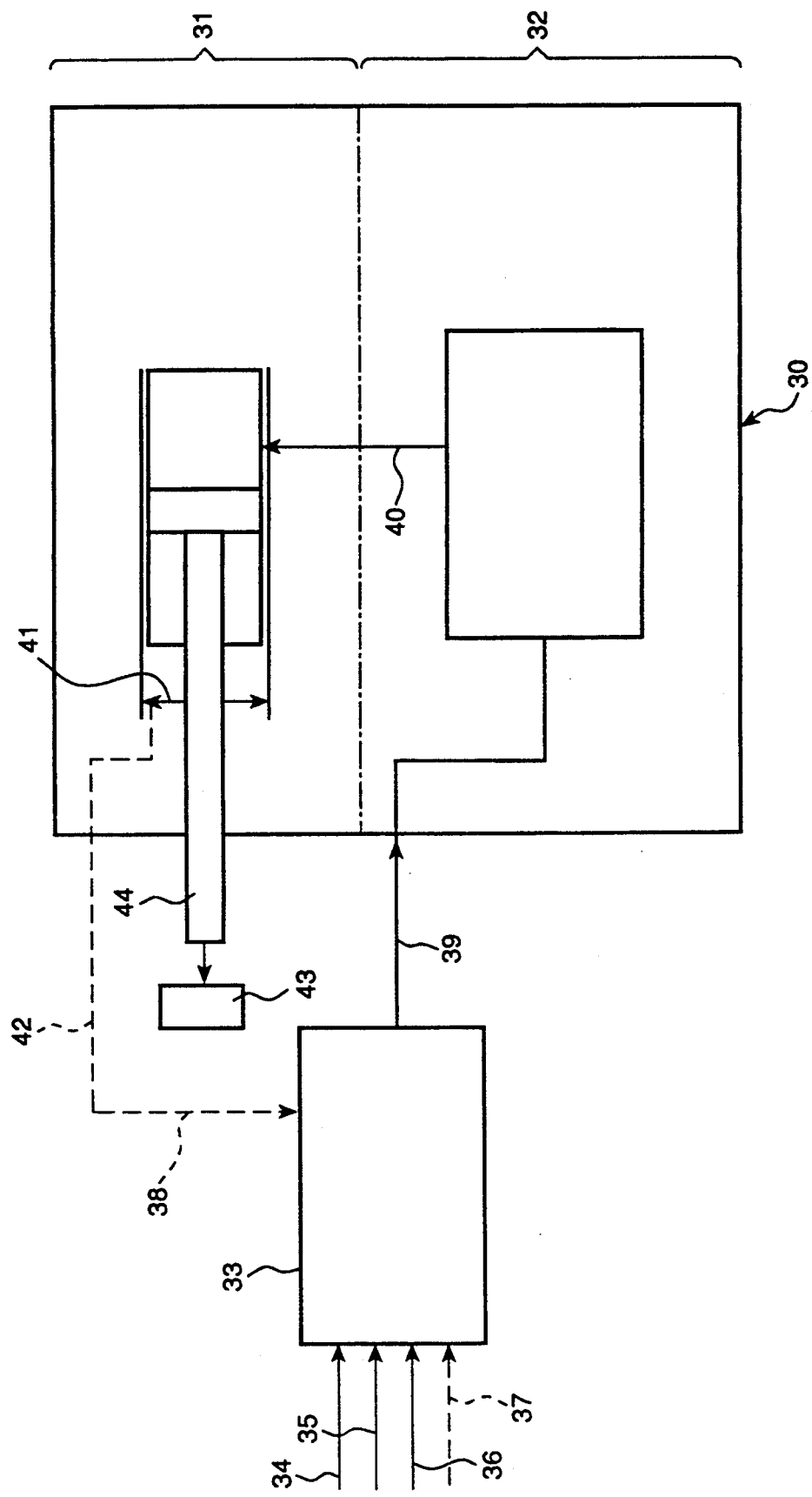

REAR WHEEL STEERING SYSTEM

FIELD OF THE INVENTION

The invention relates to a rear wheel steering system having a hydraulic actuating cylinder which actuates a steering linkage and which is actuable by a hydraulic actuator which, in turn, is driven by an electronic controller.

BACKGROUND OF THE INVENTION

Rear wheel steering systems are well known. It is particularly known to use a 4/3 proportional valve to actuate an actuating cylinder where said actuating cylinder is a synchronizing cylinder. Such prior art synchronizing cylinders have a mechanical hydraulically actuated clamping assembly, i.e. the release function is achieved by hydraulic means known in the field of hydraulic actuation. These prior art rear wheel steering systems require a relatively large number of complex components, leading to relatively high cost of such prior art rear wheel steering systems.

In FIG. 1 is shown a diagram of a prior art rear wheel steering system 11 which uses a synchronizing cylinder 12 (actuating cylinder) which is operated by a hydraulic actuator 13.

The actuating cylinder 12 contains a piston 14 which has attached on each side piston rods 15, 16. Attached to piston rod 16 is a clamping assembly 17 normally clamping (to spring action) and thus fixing the rod 16 to the inner wall of cylinder 12. The clamping assembly is hydraulically releasable by means of a 3/2 directional control valve 18.

A 4/3 proportional directional control valve 19 can be actuated by electrical signals so as to supply pressurized fluid via a first 2/2 directional control valve 20 into a first cylinder chamber 22, or via a second 2/2 directional control valve 21 to a second cylinder chamber 23, thereby initiating a steering process.

SUMMARY OF THE INVENTION

It is an object of the present invention to provide a rear wheel steering system having a design which minimizes the manufacturing and maintainance cost and which offers operational safety and means for checking the function of the system during operation.

It is a further object of the invention to provide for automatic clamping of the actuating cylinder, i.e. its piston in its respective position by hydraulic means, in case of problems or failure (failure of the pump supplying pressurized fluid and/or failure of an electronic controller).

It is another object of the present invention to provide operations or functions of the reel wheel steering system such that smooth (non-jerky) continious mechanical motions can be obtained.

It is a still further object of the present invention to provide a rear wheel steering system wherein the actuating cylinder is a differential cylinder.

An additional object of the invention is to provide a control valve which is connected to one cylinder chamber, with the other cylinder chamber being connected to the pump pressure (pump port).

Still a further object of the invention is to provide a proportional valve associated with the differential cylinder, and more particularly a 3/3 proportional directional control valve which preferably has a damping position or a mechanical feedback means to the piston of the actuating cylinder.

BRIEF DESCRIPTION OF THE DRAWINGS

Additional objects, advantages and features of the invention will become apparent from the specification when viewed in conjunction with the drawings, wherein:

FIG. 1a is a schematic diagram illustrating the basis of the present invention;

DESCRIPTION OF PREFERRED EMBODIMENTS

Figure 1:
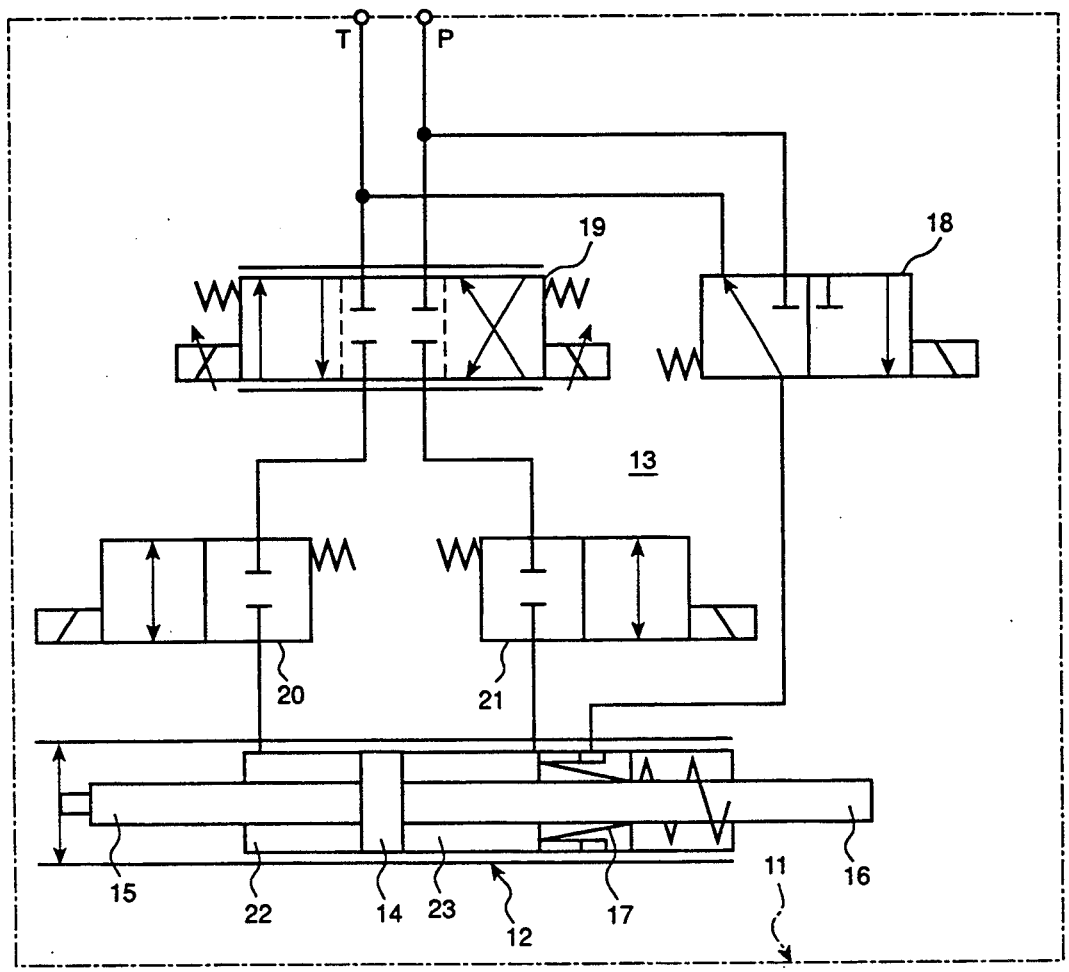
FIG. 1 is a diagram of a prior art rear wheel steering system.

FIG. 1a shows a rear wheel steering system 30 in accordance with the invention comprising an actuating cylinder 31 and hydraulic actuator means 32. An electronic controller 33 has several inputs 34–38 and provides an electrical output signal 39 to control the hydraulic actuator 32. Inputs to electronic controller 33 are, for example, the turning angle of the steering wheel and the vehicle speed. Additionally, information about the operational or actual status of the rear wheel steering system 30 can be fed back to electronic controller 33 through electrical connection 42 at input 38. It should be noted that the electrical output signal 39 of controller 33 does not have to be a single signal but can consist of a plurality of signals, depending on the signal requirements of the hydraulic actuator 32. If, for example, hydraulic actuator 32 is to be controlled by output signal 39 then signal 39 can consist of control voltage signals or control currents which might be required for energizing or actuating the solenoids of the various valves described in conjunction with FIGS. 2–10.

It will become apparent from the following description that, for the most part, in the present invention the output signal 39 will consist of two individual control signals, namely one for the control of a proportional solenoid used for controlling a steering valve, and a second signal for control of a switching solenoid which controls a directional control valve to be described further below.

It is demonstrated in FIG. 1a that hydraulic actuator 32 converts the electrical signal 39 into a hydraulic signal 40 which is supplied to actuating cylinder 31, the latter being preferably a differential cylinder in accordance with the invention. The differential cylinder 31 has (preferably) only a single piston rod 44 which moves or actuates a steering linkage 43 or the like. Preferably, piston rod 44 has associated with it a redundant positional transducer 41 which provides an electrical output signal on the electrical connection 42 to the electronic controller 33.

Additionally, when a double-sided piston linkage is required for the actuating cylinder 31, a second piston rod can be provided opposite piston rod 44 having a smaller diameter than rod 44.

Before entering detailed discussion of FIGS. 2 through 10, it is noted again that in accordance with the present invention the actuating cylinder 31 is preferably constructed as a differential cylinder which is controlled at a first piston head chamber 53 bounded by the large area of the piston 310, the control being preferably through a three-way proportional valve, while supply pressure is acting upon the smaller annular surface of piston 310, i. e. in piston rod chamber 54. Thus preferably, the present invention does not use a synchronizing cylinder as an actuating cylinder.

Figure 2:
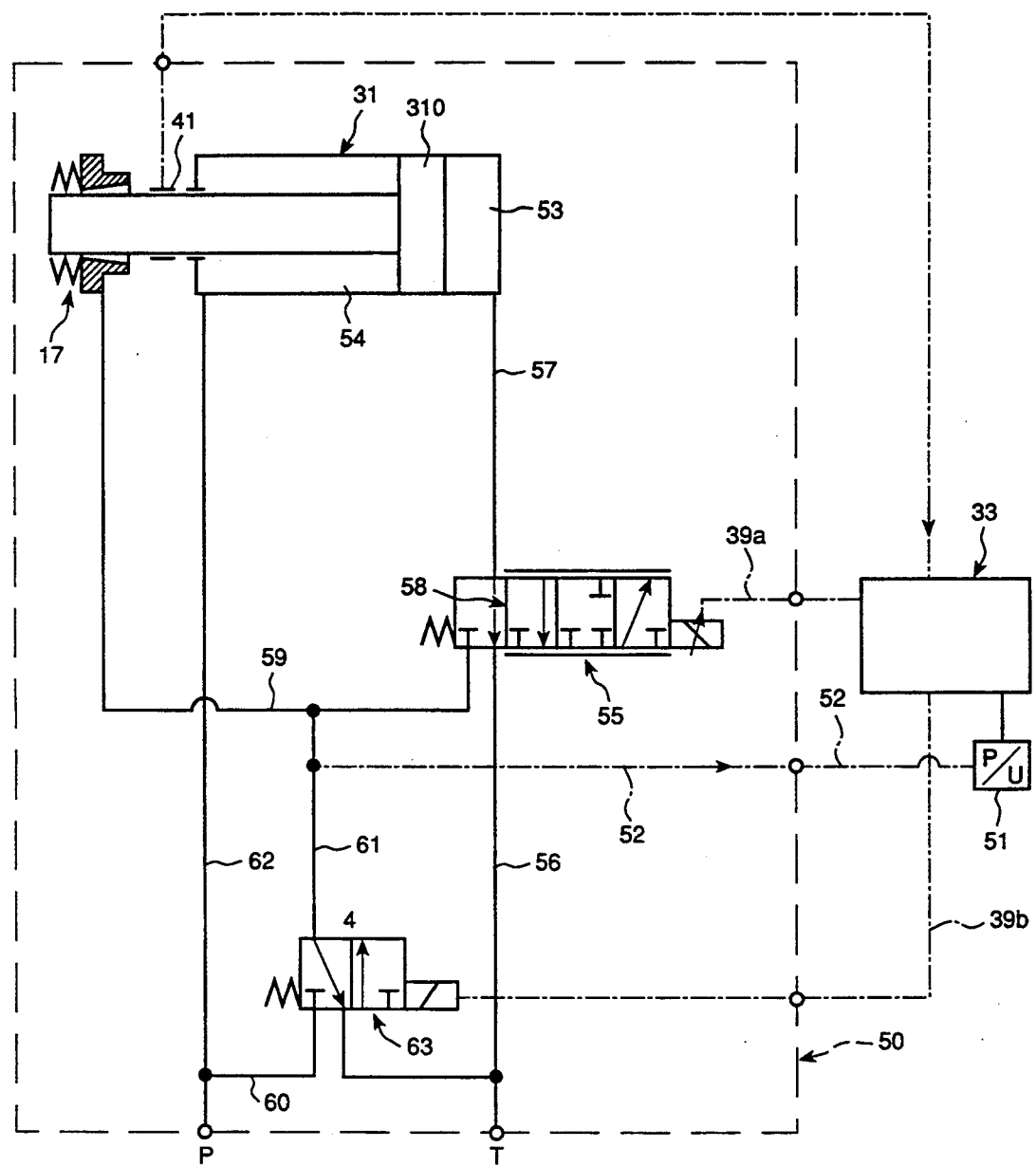
FIG. 2 is a schematic representation of a rear wheel steering system in accordance with a first embodiment of the invention.

FIG. 2 depicts a first embodiment of a rear wheel steering system 50 which is actuated by electronic controller 33. The control signal 39 shown in FIG. 1a consists according to FIG. 2 of two control signals 39a and 39b. Input signals to electronic controller 33 are obtained from redundant positional transducer 41 and from a pressure transducer or pressure sensor 51 which is connected with the rear wheel steering system 50 through a conduit 52.

The rear wheel steering system 50 has a differential actuating cylinder 31 with a head chamber 53, a rod chamber 54 and associated clamping assembly 17 similar to the one described in connection with FIG. 1. A three-way proportional valve 55 is actuated by control signal 39a and it is located in a connecting conduit 56, 57 between tank port T and head chamber 53. Proportional valve 55 has a throttle position which is assumed whenever valve 55 is not actuated (i. e. unactuated). In this rest position of valve 55 a throttle 58 resides between head chamber 53 and tank port T.

Between the remaining connection of the three-way proportional valve 55 and clamping assembly 17 is a conduit 59. Conduit 59 is additionally connected to a pump port P through conduits 60, 61. In conduits 60, 61 is a 3/2 directional control valve 63 which, in the position shown (its unactuated or rest position), blocks the connection between conduit 60 and 61 and, at the same time, connects conduit 61 with tank port T. Tank port P is also directly connected to rod chamber 54 via conduit 62. Thus, the supply or system pressure acts unrestrictedly on the annular surface (rod side) of differential cylinder 31, even when the supply or pump pressure is disconnected from proportional valve 55 through valve 63.

During operation, electronic controller 33 provides a control signal 39a to proportional valve 55 so that valve 55 produces greater or lesser pressure in chamber 53, depending on the desired degree of steering. During operation, directional control valve 63 is normally also actuated through a control signal 39b (directional control valve 63 will be in a position not shown in the drawing, i. e., P is provided to conduits 61 and 59). Pressure transducer 51 measures pressure in conduits 59, 61 and transfers the respective electrical signal along electrical connection 52 to electronic controller 33.

In the "fail-safe" mode, proportional valve 55 is in the indicated end or terminal position, i. e. the head chamber 53 is connected with tank T through a throttle 58 within valve 55. Simulaneously, 3/2 directional control valve (switching valve) 63 advances into its not energized position and connects clamping assembly 17 as well as supply conduit 59 of proportional valve 55 with the tank T.

Mechanical clamping is possible in any arbitrary position of the piston rod by means of the electronic signal control of the directional control valve 63. In case of failure of the mechanical clamping, the "fail-safe" position at the defined final stop to the right of cylinder 31 is achieved through the unrestricted connection of the P-conduit 62 to differential cylinder 31. In this case the piston 310 of cylinder 31 translates to the right stop under throttling conditions by throttle 58 in valve 55.

The pressure transducer 51 connected to the connecting conduits 59, 61 between directional control valve 63 and proportional valve 55 recognizes either that pressure is present in said conduit, i. e. that directional control valve 63 has switched, or that pressure is absent in said conduit. In the latter case, clamping assembly 17 has to clamp. If, however, a motion (of the piston) of differential cylinder 31 is indicated by positional transducer 41, electronic controller 33 will conclude that the mechanical clamping assembly 17 is not functioning.

As mentioned earlier, associated with differential cylinder 31 is a redundant positional transducer 41, preferably a so-called redundant potentiometer having dual resistive tracks and dual slide arms. The inputs to electronic controller 33 are in that case also double inputs.

Figure 3:
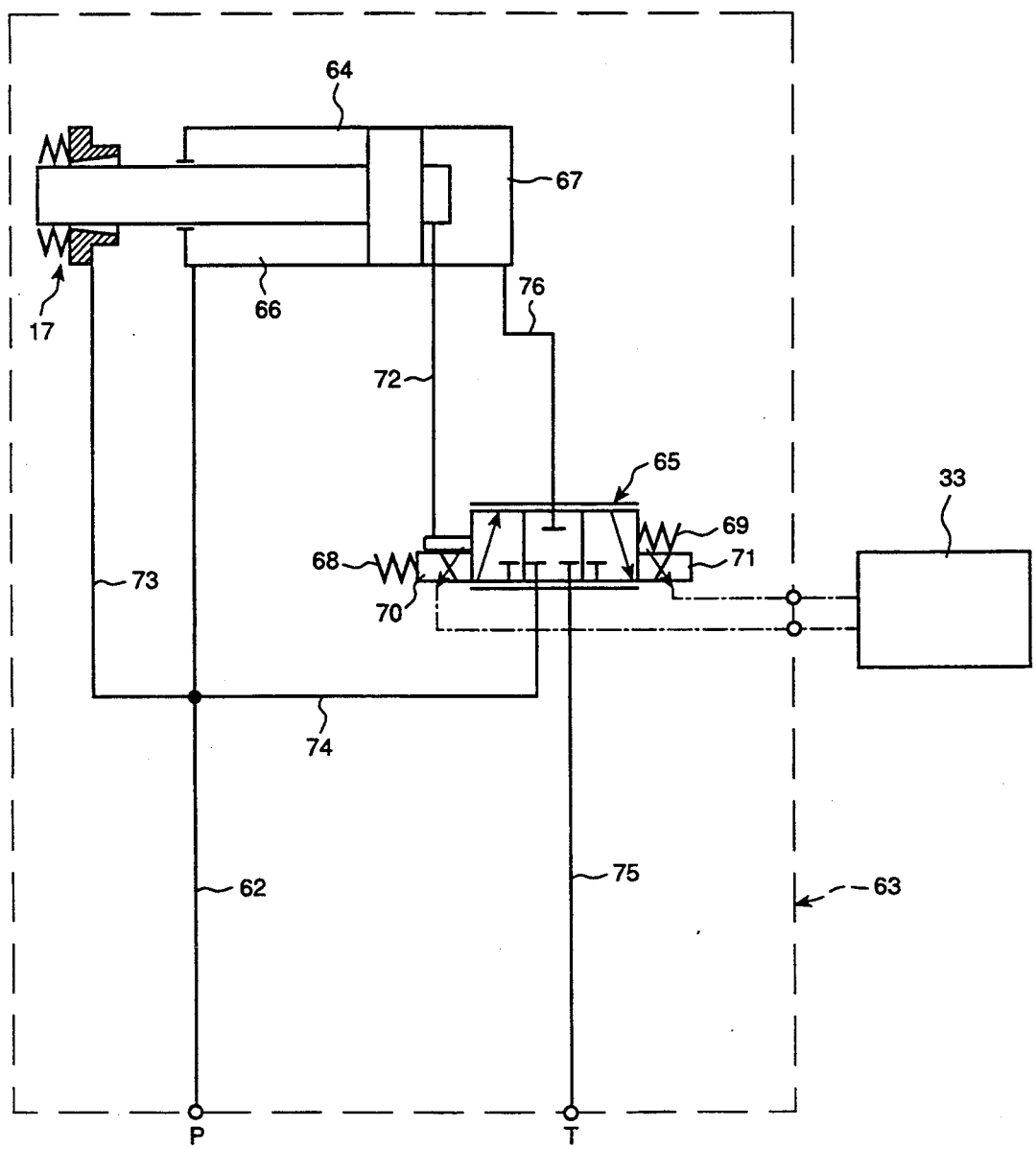
FIG. 3 is a diagram of a second embodiment of the invention.
Figure 4:
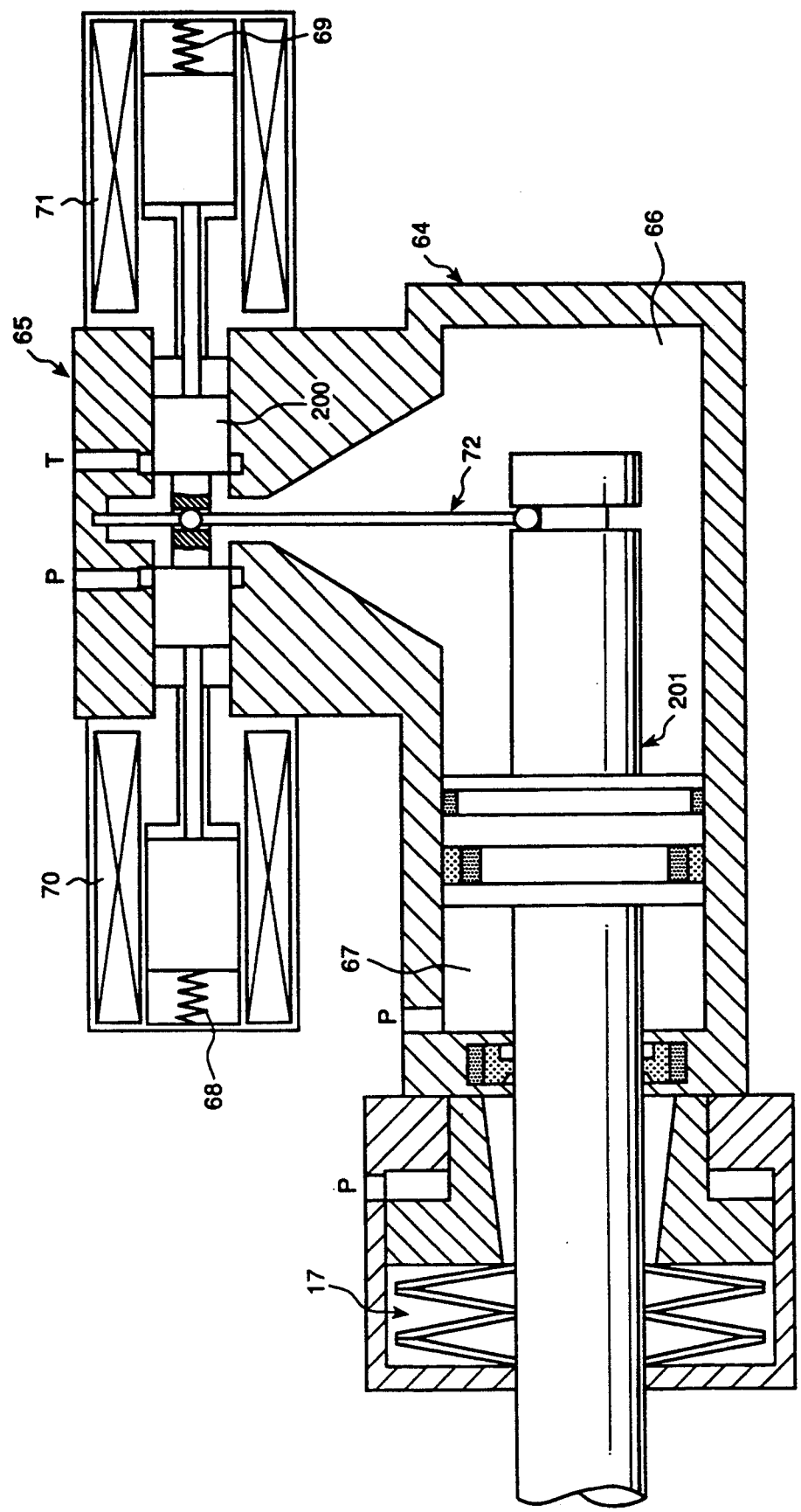
FIG. 4 is a break-away view of a single, composite assembly of the valves shown in the embodiment of FIG. 3.

In FIGS. 3 and 4 is depicted a further embodiment of the invention. Here, electronic controller 33 controls a rear wheel steering system 63 which is configured of a differential actuating cylinder 64 and a so-called pure three-way proportional valve 65, i. e. one not comprising the throttle position of valve 55 in FIG. 2.

Three-way proportional valve 65 is self-centering and has for this purpose two springs 68, 69 (FIG. 4). Contained within three-way proportional valve 65 are two oppositely located proportional solenoids 70, 71, and a mechanical feedback 72 extends between the piston of valve 65 and the piston (or a lenghtwise extension thereof) of actuating cylinder 64. In FIG. 4 the feedback mechanism is a flexible beam 72 which is suitably clamped in the housing of valve 65 and which is movably disposed in valve piston 200 and in working piston 201. The feedback mechanism can also be a suitably arranged angled lever or a cam follower arm or pin which could follow an inclined plane on a portion of the piston (not shown). The association among supply pressure, springs 68, 69 and solenoids 70, 71, respectively, affects a self-centering of valve 65 and of the working piston in the case of "no-current" (non-energizing). During normal operation a mechanical-hydraulic force control exists in accordance with the "sequence or follower principle". This principle provides for a self-centering when proper supply pressure is present. If supply pressure is absent (a failure), then the clamping system can no longer be pressurized and will therefore clamp the piston rod in the actual rod position existing upon the incident of pressure failure. Actuating cylinder 64 also has a piston head chamber 66 and a rod chamber 67.

As indicated particularly in FIG. 3, the pump port P of rear wheel steering system 63 is connected to rod chamber 66 via conduit 62. A branch conduit 73, off conduit 62, connects to clamping assembly 17. A further conduit 74 connects conduit 62 to one input of proportional valve 65, the other input being connected to tank port T through conduit 75. The output of proportional valve 65 connects with head chamber 67 through conduit 76. Through electrical connections not detailed in FIG. 3, electronic controller 33 is connected to proportional solenoids 70 and 71 of valve 65 to actuate those solenoids.

FIG. 4 shows a preferred implementation of the invention whereby proportional valve 65 is built onto actuating cylinder 64. This provides for a compact assembly and effectively eliminates the positional transducer required in previous embodiments.

In addition to the previously mentioned self-centering feature, the rear wheel steering system 63 in accordance with FIG. 3 has mechanical clamping 17 for the actuating cylinder as well as defined end position stops.

Figure 5:
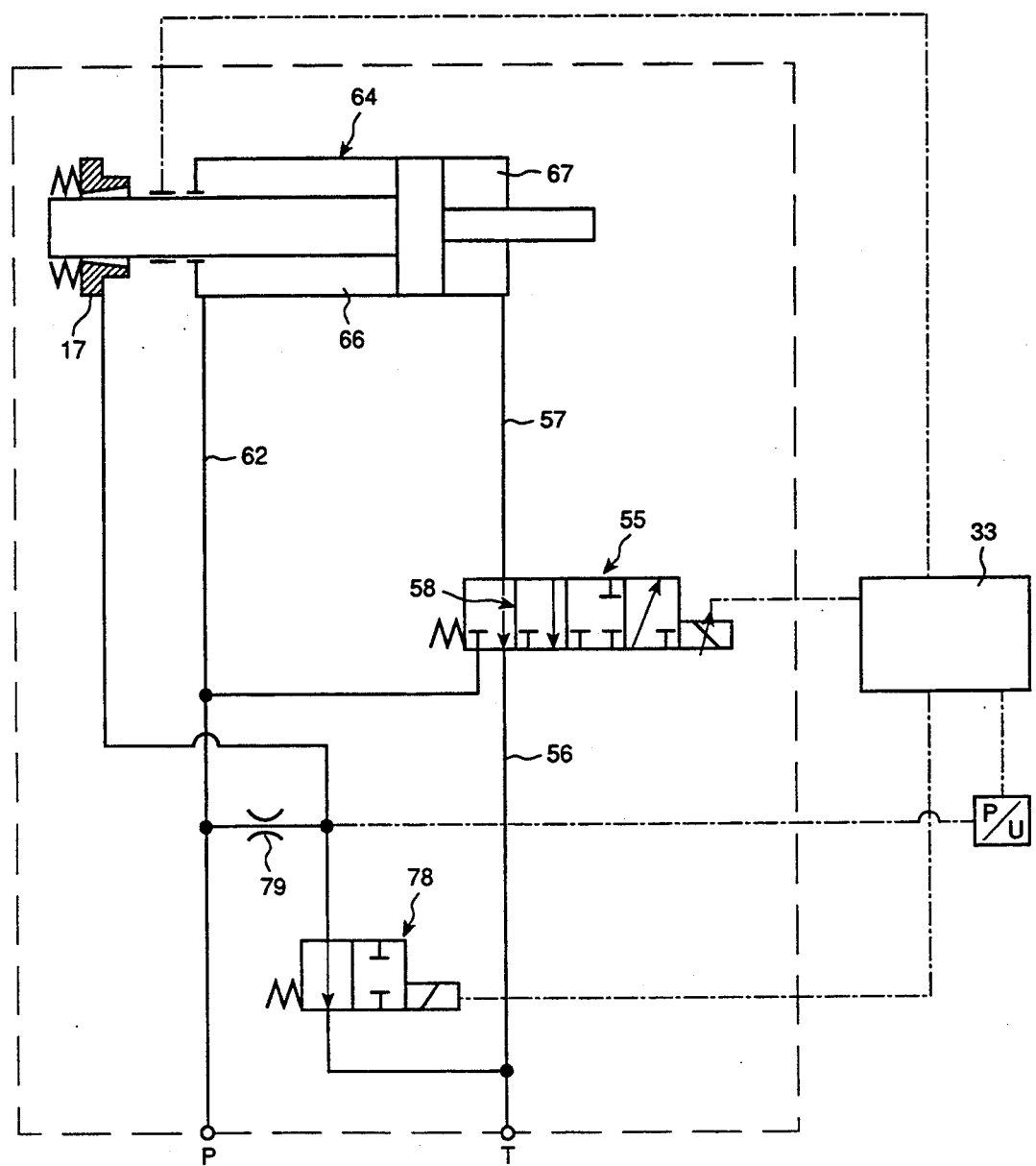
FIG. 5 is a diagram of a third embodiment in accordance with the invention.

In FIG. 5 is shown a variation or third embodiment of the embodiment of FIG. 2, in that the 3/2 directional control valve 63 of FIG. 2 is replaced by a lower-cost 2/2 directional control valve 78. Furthermore, an orifice 79 provides for pressure reduction so that somewhat reduced pressure is available for clamping of the piston of actuating cylinder 64 (pressure is reduced compared to pressure at port P). Other features are similar to the embodiments of FIGS. 2 and 3 and reference is made to the respective description.

Figure 6:
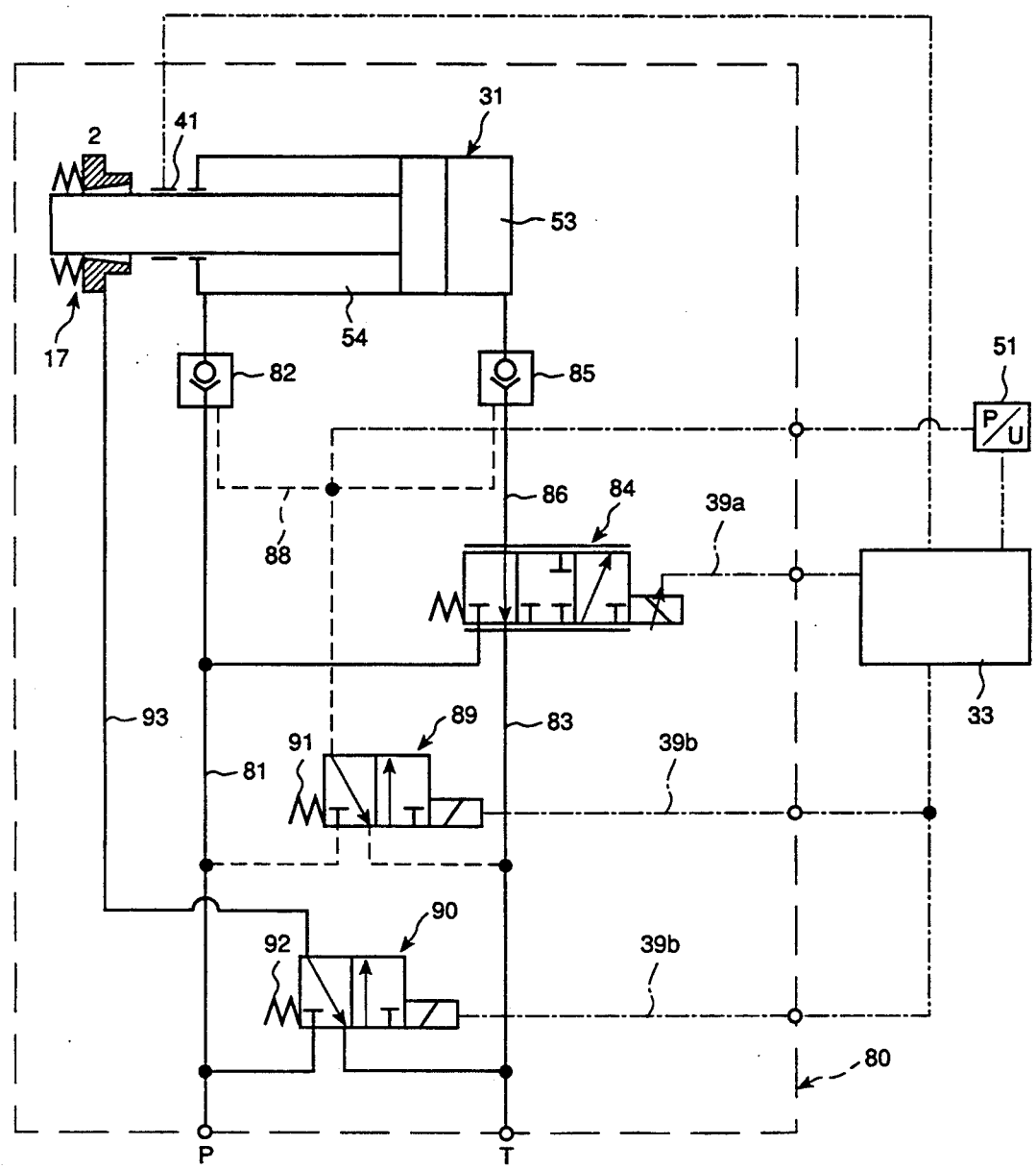
FIG. 6 is a representation of a fourth embodiment of the invention.

FIG. 6 is a diagram of a fourth embodiment of a rear wheel steering system 80 in accordance with the invention. Again, electronic controller 33 provides two control signals 39a and 39b as outputs to rear wheel steering system 80. Controller 33 receives as its input electric signals from pressure transducer 51 and from position transducer 41.

Rear wheel steering system 80 comprises clamping assembly 17 and an actuating cylinder 31 with a head chamber 53 and a rod chamber 54. Pump port P is connected with rod chamber 54 through conduit 81 and a check valve 82. Tank port T is connected with head chamber 53 through conduit 83, directional valve 84 (a pure three-way proportional valve), a conduit 86 and a check valve 85. The two check valves 82, 85 are releasable and, for release purposes, a control conduit 88 is provided which is connected to the output of a 3/2 directional control valve 89. Valve 89 has inputs connected to conduits 81 and 83 (shown in dashed outline in FIG. 6), and directional control valve 89 is urged into the indicated position by a spring 91. Valve 89 can be actuated through electrical signal 39b supplied by electronic controller 33.

Additionally, a further 3/2 directional control valve 90 is shown in a non-energized or rest position into which it is urged by spring 92. Directional control valve 90 is linked with clamping assembly 17 through conduit 93. Inputs of directional control valve 90 go to the pump port P and to the tank port T, respectively.

A particular feature of this embodiment of the invention is that both, a mechanical clamping and a hydraulic clamping are provided, as are defined end or terminal stops. Proportional valve 84 no longer has the previously indicated throttled end position, since it is, as previously mentioned, a pure three-way proportional valve. In addition to the 3/2 directional control valve (switching valve) 89, the additional 3/2 directional control valve (switching valve) 90 is provided, which only switches on and off the pressure to mechanical clamping assembly 17. Directional control valve 89 serves to actuate the two releasable check valves 82 and 85. Assuming that tank pressure prevails at the connecting conduit 88 between the directional control valve 89 and check valves 82 and 85 (i.e. directional control valve 89 is opened in the no-current condition), the check valves 82 and 85 will block differential cylinder 31 hydraulically.

When valves 89 and 90 are turned off, the full supply pressure is directed at check valve 82 and proportional valve 84. Thus, it is possible to conduct an isolated "power-up-check", i.e. when directional control valve 90 is turned off and directional control valve 89 is turned on, proportional valve 84 can be used as a means to test whether or not the mechanical clamping assembly 17 is functional.

In contrast, it is also possible to test the hydraulic clamping when the directional control valve 90 is turned on and directional control valve 89 is turned off.

In this example, a positional transducer 41 is provided, preferably in the form of a redundant potentiometer, as well as a pressure transducer 51 which recognizes whether or not pressure is present in the control conduit between valves 89, 82 and 85.

Figure 7:
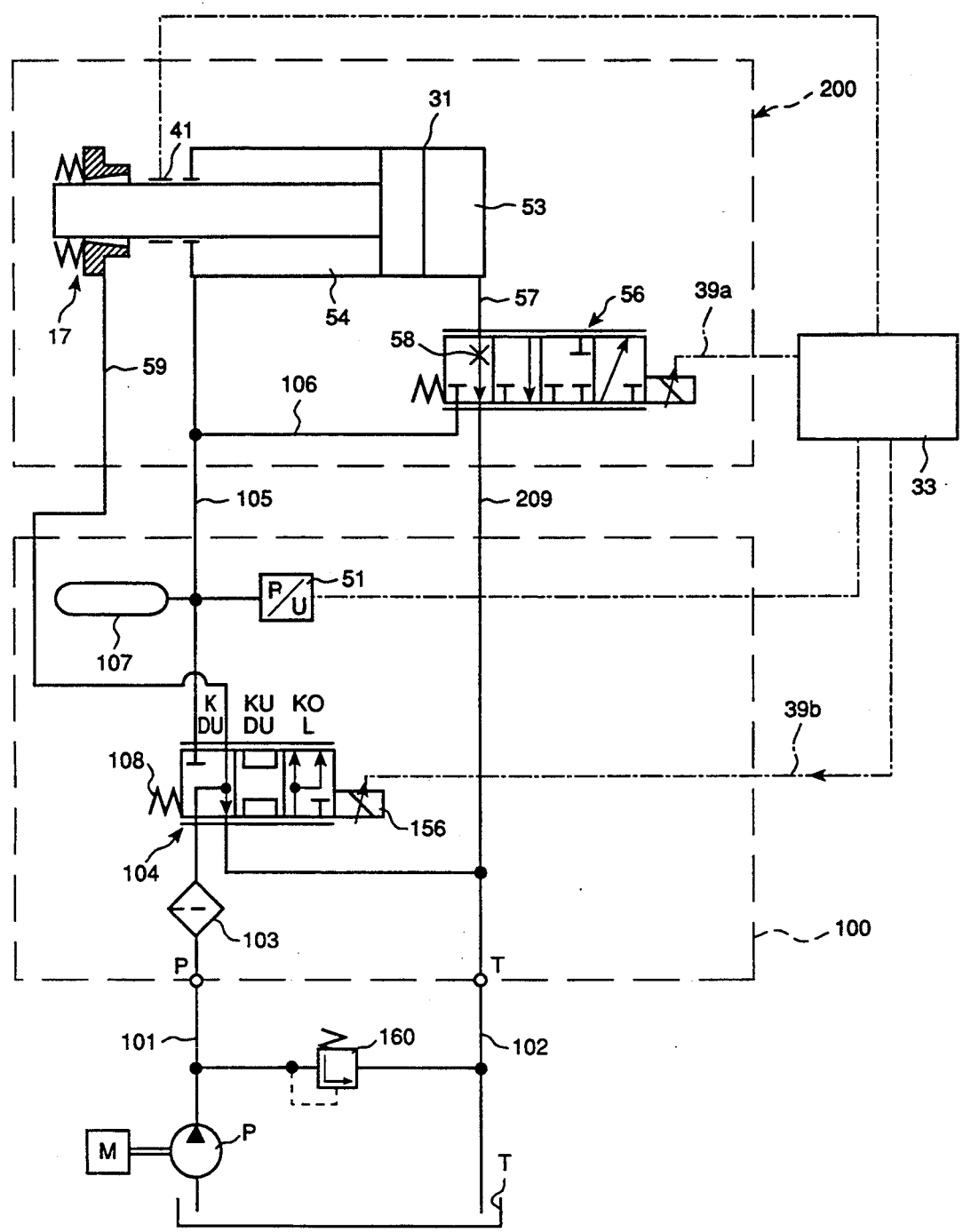
FIG. 7 is a schematic diagram of a fifth embodiment of the rear wheel steering system in accordance with the present invention.

FIG. 7 is a fifth embodiment similar to FIG. 2 but providing additionally a chargeable accumulator unit 100 and a motor driven pump with an associated pressure relief valve 160. Chargeable storage or accummulator unit 100 is connected with the pump P through a conduit 101 and it is connected with tank T through conduit 102. Conduit 101 proceeds to a directional control valve 104 through a filter 103. The output of valve 104 is connected to rod chamber 54 through conduit 105. Conduit 102 coming from the tank T is directly connected to a throttle 58 which is associated with proportional valve 56, whose second input is connected with conduit 105 through conduit 106.

With conduit 105 is also connected an accumulator 107 as well as pressure transducer 51.

The directional control valve 104 is actuated by an electrical signal 39b and valve 104 has preferably three positions whereby the position indicated in FIG. 7 is assumed due to the force of the spring 108 when no actuation is present. In the indicated position of directional valve 104, clamping assembly 17 clamps and therefore there is pressure-free circulation. In the middle directional position of valve 104 the clamping is open and pressure-free circulation prevails. In the position to the right the clamping is open again and the accumulator 107 is being charged.

Compared with the embodiment in FIG. 2 the directional control valve 63 in FIG. 2 is now associated or combined with valve 104 controlling the charging of accumulator 107. The directional control valve 104 takes on, in addition to the turning-off the supply pressure from differential cylinder 31 and proportional valve 56, also the turn-off function of the mechanical clamping means and beyond that function the functions of charging and discharging of accumulator 107. This occurs in the following manner: Pressure transducer 51 recognizes which charging pressure in accumulator 107 prevails. The three positions of directional control valve 104 have the following designations and associated functions: K/DU means non-energized translationary motion into the position K/DU; a tank pressure T acts on clamping assembly 17, i.e. clamping means is closed (clamped); pressure-less circulation for the pump; accumulator 107 is charged. Middle position KO/DU means pressure-less circulation; storage chamber 107 exerts pressure acts upon clamping assembly 17, i.e. clamping assembly 17 opens, differential cylinder 31 translates according to pressure in storage chamber 107. Position KO/L means that the storage pressure is too low, i.e. charging of accumulator 107 must take place; clamping means is open since pressure acts on clamping assembly 17, which thus opens. Simultaneously, control can be exercised in the functions KO middle position and the right-most position at all times through proportional valve 56, differential cylinder 31 and the feedback means through the two potentiometers. It should be mentioned that valve 104 can be operated with a proportional solenoid 156 so as to achieve the middle position or with two separate solenoids and associated springs. In the latter case the middle position has to be maintained by means of centering devices (not shown) at right and left stops.

The following conduits are provided between control element or unit 200 and chargeable accumulator unit 100: conduit 59 for clamping assembly (control conduit), pressure supply conduit 105 and tank connection conduit 209.

Input signals to electronic controller 33 are the pressure transducer signal and positional transducer potentiometer signal. Output signals are signals to the control solenoids of valve 56 and to the switching solenoid of valve 104 (or electrical connections to two switching solenoids within valve 104). The status of directional control valve 104 is recognized through pressure transducer 51 and electronic controller 33.

Figure 8:
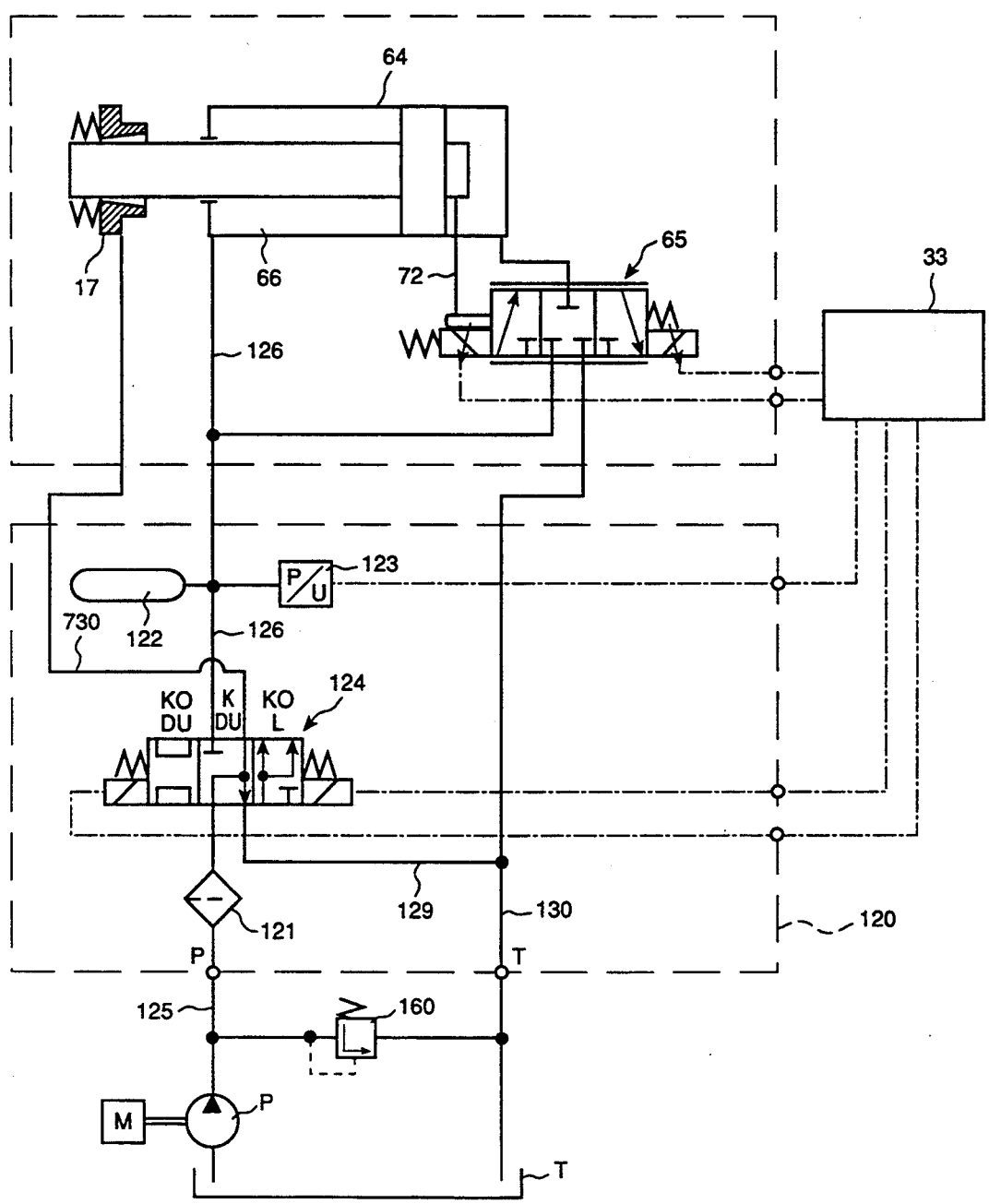
FIG. 8 is a diagram of a sixth embodiment of the invention.

The diagram of FIG. 8 shows a further sixth modification of the embodiment in accordance with FIG. 3 whereby, similar to FIG. 7, an additional chargeable accumulator unit 120 is depicted. Reference is made to FIGS. 3 and 7 in the context of the following discussion. In FIG. 8 actuating cylinder 64 is shown together with clamping assembly 17. Also depicted is a mechanical feedback means 72 between actuating cylinder 64 and three-way proportional valve 65. The three-way proportional valve 65 has (like in FIG. 3) two proportional solenoids and two springs. Electronic controller 33 serves to actuate the two solenoids. Chargeable accumulator unit 120 contains a filter 121, an accumulator 122, a pressure transducer 123 and a directional control valve 124. Valve 124 has preferably a self-centering feature. It is equipped with actuating solenoids as well as springs on both opposing sides whereby the actuating solenoids are being actuated through control signals derived from electronic controller 33. The switch position designations KO/DU, K/DU and K/OL are equivalent to those in FIG. 7.

Pump P is connected through a conduit 125 and a filter 121 with one of the inputs of valve 124. The output of valve 124 is connected through conduit 126 with rod chamber 66 of cylinder 64, and is further connected with one of two inputs of proportional valve 65. Also, connected to conduit 126 is accumulator 122 and pressure transducer 123. The second input of the directional control valve 124 is linked with conduit 130 through conduit 129, where conduit 130 also connects tank T with the second input port of proportional valve 65. The second output of the directional control valve 124 is connected to clamping assembly 17 through conduit 730.

The embodiment according to FIG. 8 provides for mechanical clamping, defined end stops as well as the self-centering feature mentioned earlier.

Figure 9:
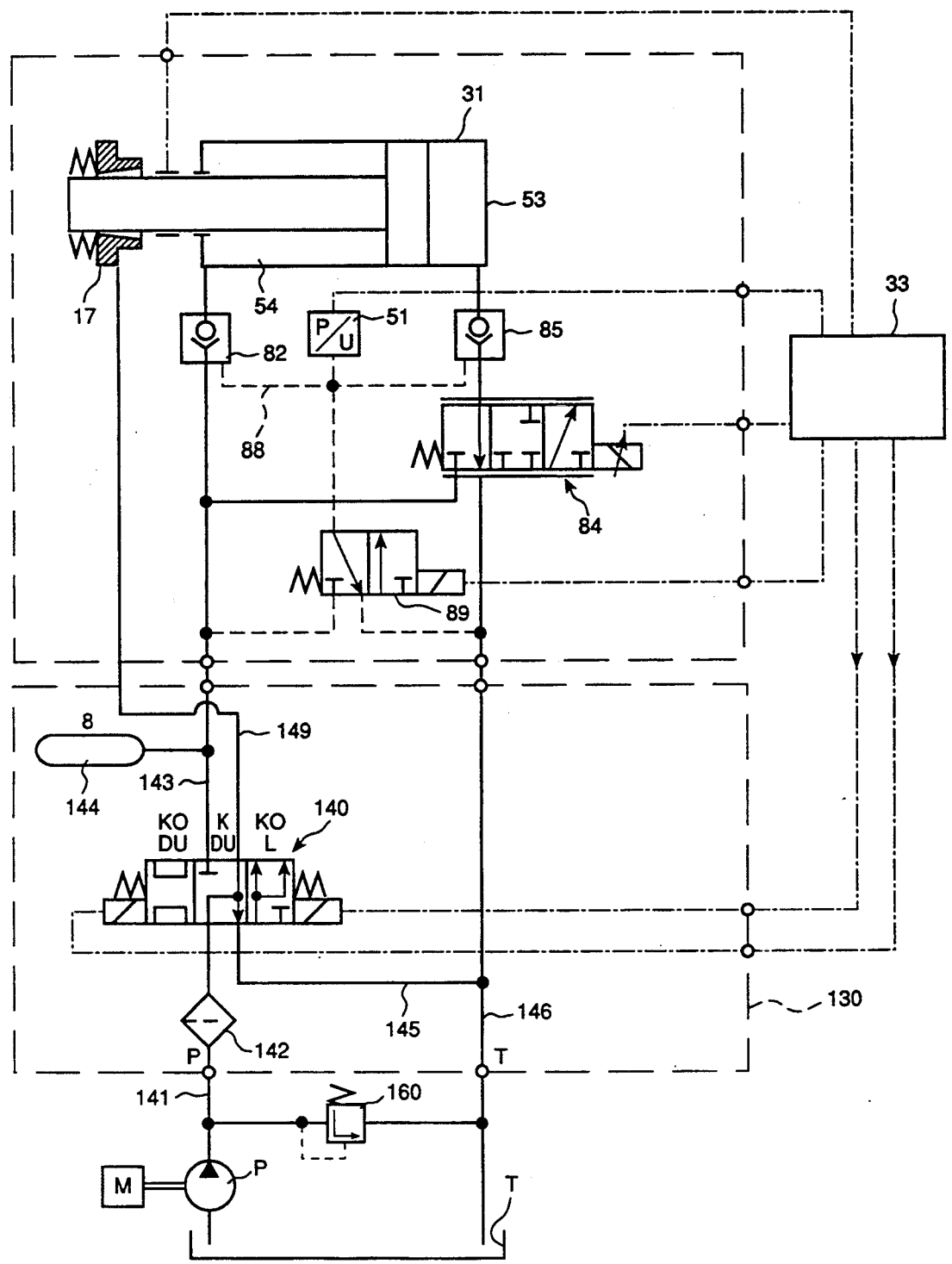
FIG. 9 is a seventh embodiment of the present invention.

The embodiment in FIG. 9 shows, in addition to (compared with FIG. 6) the actuating element 31, a chargeable accumulator unit 130. Details pertaining to elements 31, 53, 54, 82, 88, 51, 85, 84 89 and 33 are equivalent to those described in the context of FIG. 6.

Directional control valve 90 of FIG. 6 is shown here as being integrated into the mid-centered directional control valve 140. The position designations KO/DU, K/DU and KO/L have the same meaning as in the description of the embodiment shown in FIG. 8.

A pump P through conduit 141 and filter 142 is associated with directional control valve 140, one output of which is connected to rod chamber 54 through conduit 143 and a check valve 82. Also, accumulator 144 is connected to conduit 143. The second input of directional control valve 140 is linked through conduit 145 to a conduit 146 which comes from tank T, and which also leads to piston chamber 53 of cylinder 31 through proportional valve 84 and check valve 85.

The second output of directional control valve 140 connects through conduit 149 to clamping assembly 17. Electronic controller 33 provides electrical signals to the two solenoids of directional control valve 140.

In summary, the directional switching function of valve 90 (FIG. 6) is now being assumed by directional control valve (switching valve) 140 as well. The function of directional valve 84 is the same as that described for FIG. 6. Also, hydraulic clamping 17 through valves 89, 82 and 85, and mechanical clamping 17 through valve 140 are effective. Valve 140 (also controlling the charging of the accumulator) is configured like that shown in FIG. 7. However, the accumulator is connected differently: in the middle position of valve 140 (K/DU) the pressure is transferred to tank T through a filter element 142. Storage chamber 144 is being clamped (shut off), i. e. a rapid clamping of mechanical clamping assembly 17 takes place since the conduit leading to clamping assembly 17 is connected with tank T (mechanical clamping).

The left-most position of valve 140 marked "KO/DU" means pressure-free circulation, i. e. the accumulator 144 is full, the differential cylinder 31 and the proportional valve 84 are supplied from accumulator 144 (connection between accumulator 144 with clamping assembly 17, check valves 82 and 85 and proportional valve 84 are provided). All clamping actions are open (unclamped). The right-most position of valve 140 "KO/L" means that accumulator 144 is empty and must be charged. Clamping assembly 17 is in the open position, and pressure is supplied at valves 82, 84 and 89. Even in that condition, independent hydraulic clamping through valves 85, 82 and 89 is functional. The storage condition is being recognized by pressure transducer 51 when valve 89 is actuated and when charge storage valve 140 is in the positions KO/DU or KO/L. In position K/DU, no further charging takes place into accumulator 144. In that circumstance an additional pressure switch (not shown) is installed at the accumulator. In the left-most position, "KO/KU", the charging pressure of accumulator 144 is recognized through the pressure transducer when valve 89 is actuated. In the position KO/L (the right-most position), pressure is delivered to clamping assembly 17 and to the supply line for proportional valve 84. The charging state of accumulator 144 can also be recognized by the pressure transducer when valve 56 is actuated. If, in all three cases, valve 89 has been switched into the no-current mode, and can therefore no longer be actuated in case of defective solenoids, for example, the charging state of accumulator 144 is, of course, no longer recognized. To address this eventuality, a pressure relief valve 160 at the pump and an additionally contemplated (not shown) pressure switch at the accumulator 144 start to function. It should be mentioned that in cases where valve 89 cannot be actuated, or is unactivated (i. e. in case the valve is switched open in the non-energized condition), the clamping function prevails through valves 82 and 85, i.e. the actuating system is clamped anyway (a pressure transducer tank signal). Then, electronic controller 33 recognizes the clamping of the actuating system 31 through the hydraulic clamping combination 85, 82 and 89. The mechanical clamping assembly can be turned on simultaneously (position "K/DU" of valve 140), irrespective of the storage condition of accumulator 144. Like in the case discussed in conjunction with FIG. 6, a separate "power-up-check" can be performed.

Figure 10:
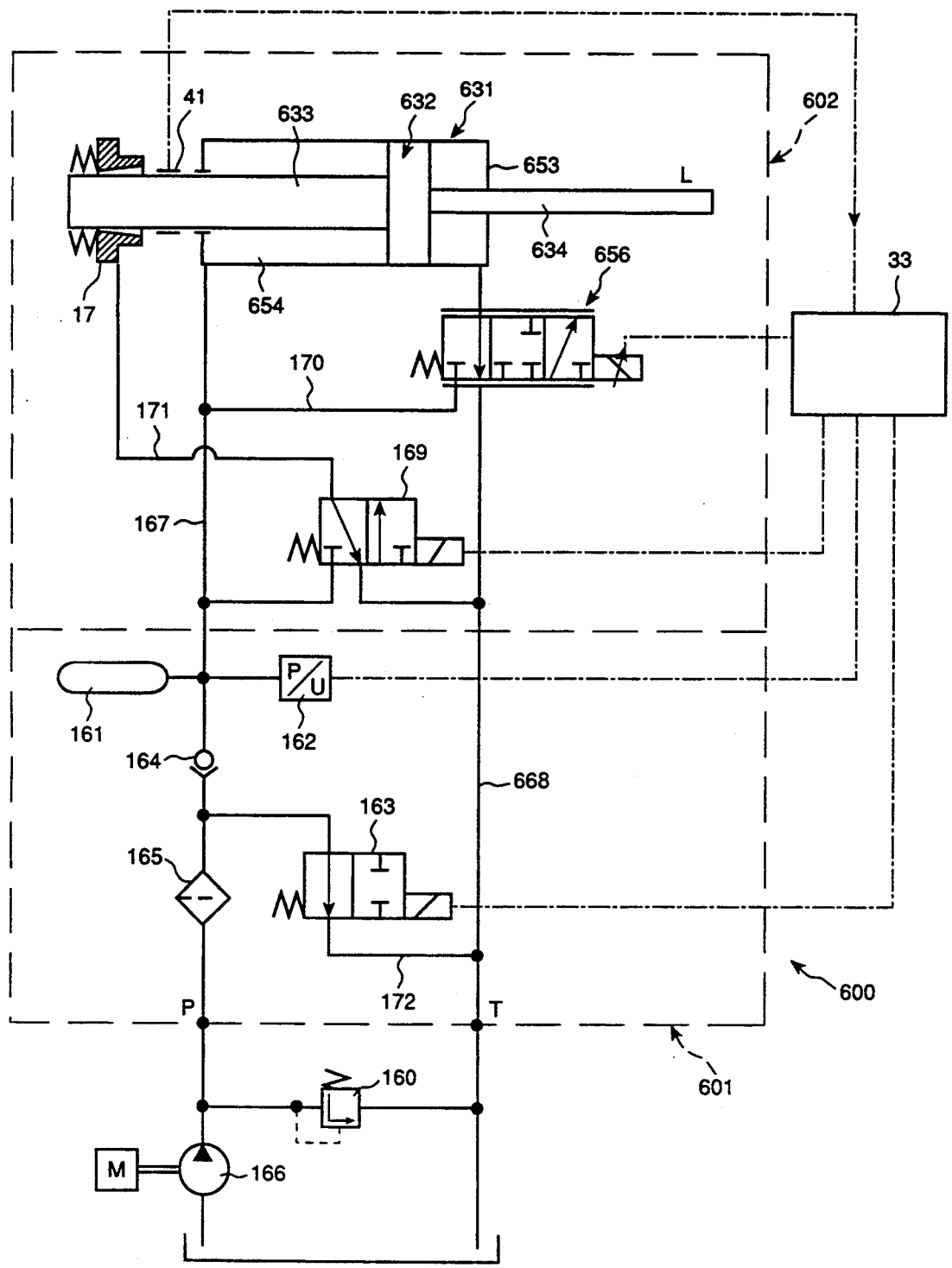
FIG. 10 shows a diagram of an eighth embodiment in accordance with the present invention.

FIG. 10 relates to an eighth embodiment of a rear wheel steering system 600. The steering system 600 is similar to earlier-described embodiments and therefore, wherever possible, similar reference numerals were used. The system 600 comprises a chargeable accumulator unit 601 which is connected to a pump 166 with an associated pressure relief valve 160. A motor M drives the pump 166 (also referred to as P). Accumulator unit 601 is connected to a control unit 602. An electronic controller 33 is provided similar to that shown in FIG. 8. In the embodiment of FIG. 10, a hydraulic actuator means 631 is provided in the form of a hydraulic cylinder with a piston 632 which comprises on its one side a large-diameter piston rod 63 and on the other side a small-diameter piston rod 634. The piston 632 forms two chambers, a rod chamber 654 and a head chamber 653. A clamping means 17 cooperates with piston rod 633.

A 3/3 proportional control valve 656 is connected with its output side to head chamber 653, and one of its inputs is connected via a line 668 to tank T. The other input is connected via line 170 to the rod chamber 654. Rod chamber 654 is further connected via a conduit 167 to the pump port P. In said conduit 167, a check valve 164 as well as a filter 165 are located.

Further, a directional control or switching valve 169 is controlled by the electronic controller 33, and is connected with its output side via a line 171 to clamping means 17. The input side of the valve 169 is connected between the conduits 167 and 668. A transducer 41 provides information about the rod position to electronic controller 33, like in the embodiments discussed above.

Unit 601 comprises an accumulator 161 which is connected to line 167. A pressure sensor 162 senses the pressure on line 167 and supplies the respective information to electronic controller 33. Another positional control valve or switching valve 163, preferably a 2/2 valve 163, is located between line 167 and line 668. The line providing the connection to line 668 is referred to by numeral 172. The operation of this circuit should be clear in view of the foregoing descriptions.

From the foregoing description it will be apparent that a rear wheel steering system has been provided which uses a hydraulic differential valve connected to a rear wheel steering linkage, and which is actuated by switching valve means controlled by associated solenoids, actuated by electrical signals from an electronic controller means. Variations and modifications of the rear wheel steering system, within the scope of the invention, will undoubtedly suggest themselves to those skilled in this art. Accordingly, the foregoing description should be taken as illustrative and not in a limiting sense.

We claim:
1. An actuating system comprising:
   a differential hydraulic cylinder means containing a piston and a piston rod connected to one side of said piston so as to define a first or head chamber (53) which is bounded by the side of the piston to which the piston rod is not connected and a second or rod chamber (54) which is bounded by the side of the piston to which the piston rod is connected;
   an actuatable means adapted to be connected to one of the hydraulic cylinder means and the piston rod;
   a proportional control valve means adapted to actuate said hydraulic cylinder means by controlling the amount of fluid supplied to said first chamber and wherein a supplied pressure is connected to said second chamber; and
   an electronic controller (33) for controlling said proportional control valve means (55), said electronic controller (33) being adapted to also control a directional control valve (63);
   said electronic controller (33) being adapted to control the proportional control valve means such that in a situation where the proportional control valve means is in its throttling end position the proportional control valve means is not energized and connects in this position a hydraulic clamping means (17) and also a pressure medium supply conduit for the proportional control valve means with a tank.

2. The system of claim 1 wherein the proportional control valve means is a three-way proportional control valve.

3. The system of claim 2 wherein said three-way proportional valve has a plurality of switching positions, one of said switching positions being an end position provided such that a throttle (58) is connected to said first chamber so as to provide for a "fail-safe" condition in which the first chamber is connected to a tank via said throttle.

4. The system of claim 1 wherein a mechanical clamping means is provided such that when the mechanical clamping means fails an unrestricted connection is provided between a pump port and the first chamber of the differential cylinder such that the piston moves towards a defined stop under control of a throttle (58).

5. The system of claim 1 wherein a pressure sensor (51) is provided to determine whether or not the directional control valve (63) has been switched.

6. The system of claim 1 wherein a positional transducer (41) is provided to supply information to the electronic controller (33).

* * * * *